(12) United States Patent
Li et al.

(10) Patent No.: US 11,895,587 B2
(45) Date of Patent: Feb. 6, 2024

(54) EARLY SLEEP STATE FOR CIRCUITRY ASSOCIATED WITH SYNCHRONIZATION WAKEUP PERIODS

(71) Applicant: QUALCOMM Incorporated, San Diego, CA (US)

(72) Inventors: Linzhe Li, San Diego, CA (US); Jun Zhu, San Diego, CA (US); Yong Li, San Diego, CA (US); Uzma Khan Qazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/380,910

(22) Filed: Jul. 20, 2021

(65) Prior Publication Data
US 2023/0024081 A1    Jan. 26, 2023

(51) Int. Cl.
*H04W 52/02*    (2009.01)
*H04W 76/27*    (2018.01)
*H04W 76/28*    (2018.01)

(52) U.S. Cl.
CPC ..... *H04W 52/0229* (2013.01); *H04W 52/028* (2013.01); *H04W 52/0248* (2013.01); *H04W 52/0264* (2013.01); *H04W 76/27* (2018.02); *H04W 76/28* (2018.02)

(58) Field of Classification Search
CPC ................................................. H04W 88/00–06
See application file for complete search history.

(56) References Cited

U.S. PATENT DOCUMENTS

| | | | |
|---|---|---|---|
| 2007/0109987 A1* | 5/2007 | Kohlmann | H04W 52/0225 370/320 |
| 2015/0341884 A1* | 11/2015 | Das | H04W 52/0216 370/311 |
| 2016/0127995 A1* | 5/2016 | Merlin | H04W 52/0229 370/311 |
| 2018/0249412 A1* | 8/2018 | Zhou | H04W 56/0015 |
| 2019/0387470 A1* | 12/2019 | Nam | H04W 72/14 |
| 2020/0107266 A1* | 4/2020 | Liao | H04W 52/0229 |
| 2020/0162939 A1* | 5/2020 | Kim | H04W 56/001 |
| 2020/0196243 A1* | 6/2020 | Kim | H04W 56/00 |

* cited by examiner

*Primary Examiner* — San Htun
(74) *Attorney, Agent, or Firm* — MG-IP Law, P.C.

(57) ABSTRACT

Disclosed are techniques for wireless communication. In an aspect, during a first synchronization wakeup period while RF circuitry and the FW circuitry are set to an active state, one or more measurements of one or more SSBs of a first SSBS from a base station. The UE predicts, during the first synchronization wakeup period while the RF circuitry and the FW circuitry are in the active state, a second SSBS at which to wake up for a second synchronization wakeup period based on the one or more measurements. In response to completion of FW post-processing operations, the UE transitions the RF circuitry and the FW circuitry from the active state to a sleep state.

30 Claims, 11 Drawing Sheets

EARLY SLEEP STATE FOR CIRCUITRY ASSOCIATED WITH SYNCHRONIZATION WAKEUP PERIODS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes performing, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predicting, during the first synchronization wakeup period while the RF circuitry and the FW circuitry are in the active state, a second SSBS at which to wake up for a second synchronization wakeup period based on the one or more measurements; performing, during the first synchronization wakeup period while the RF circuitry and the FW circuitry are in the active state, one or more FW post-processing operations based on the one or more measurements; transitioning the RF circuitry and the FW circuitry from the active state to a sleep state in response to completion of the one or more FW post-processing operations; and determining, during the first synchronization wakeup period while the RF circuitry and the FW circuitry are in the sleep state, a wakeup time associated with the second SSBS for the second synchronization wakeup period.

In some aspects, the method includes performing, during the first synchronization wakeup period while the RF circuitry and the FW circuitry are in the sleep state, one or more software (SW) post-processing operations based on the one or more measurements.

In some aspects, the method includes performing, during the first synchronization wakeup period while the RF circuitry and the FW circuitry are in the active state and prior to the one or more measurements, one or more FW pre-processing operations, one or more software (SW) pre-processing operations, or a combination thereof.

In some aspects, the second SSBS corresponds to a next available SSBS opportunity from the base station subsequent to the first SSBS.

In some aspects, one or more SSBS opportunities from the base station are available between the first SSBS and the second SSBS.

In some aspects, the one or more measurements comprise one or more signal-to-noise ratio (SNR) measurements.

In some aspects, the method includes determining a relationship between the one or more measurements and one or more performance thresholds, wherein the prediction of the second SSBS is selectively performed based upon the relationship.

In some aspects, the one or more performance thresholds are based on an operational mode of the UE.

In some aspects, the prediction of the second SSBS is selectively performed based a mobility parameter associated with the UE.

In an aspect, a user equipment (UE) includes a memory; at least one transceiver; and at least one processor communicatively coupled to the memory and the at least one transceiver, the at least one processor configured to: perform, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predict, during the first synchronization wakeup period while the RF circuitry and the FW circuitry are in the active state, a second SSBS at which to wake up for a second synchronization wakeup period based on the one or more measurements; perform, during the first synchronization wakeup period while the RF circuitry and the FW circuitry are in the active state, one or more FW post-processing operations based on the one or more measurements; transition the RF circuitry and the FW circuitry from the active state to a sleep state in response to completion of the one or more FW post-processing operations; and determine, during the first synchronization wakeup period while the RF circuitry and the FW circuitry are in the sleep state, a wakeup time associated with the second SSBS for the second synchronization wakeup period.

In some aspects, the at least one processor is further configured to: perform, during the first synchronization wakeup period while the RF circuitry and the FW circuitry are in the sleep state, one or more software (SW) post-processing operations based on the one or more measurements.

In some aspects, the at least one processor is further configured to: perform, during the first synchronization wakeup period while the RF circuitry and the FW circuitry are in the active state and prior to the one or more measurements, one or more FW pre-processing operations, one or more software (SW) pre-processing operations, or a combination thereof.

In some aspects, the second SSBS corresponds to a next available SSBS opportunity from the base station subsequent to the first SSBS.

In some aspects, one or more SSBS opportunities from the base station are available between the first SSBS and the second SSBS.

In some aspects, the one or more measurements comprise one or more signal-to-noise ratio (SNR) measurements.

In some aspects, the at least one processor is further configured to: determine a relationship between the one or more measurements and one or more performance thresholds, wherein the prediction of the second SSBS is selectively performed based upon the relationship.

In some aspects, the one or more performance thresholds are based on an operational mode of the UE.

In some aspects, the prediction of the second SSBS is selectively performed based a mobility parameter associated with the UE.

In an aspect, a user equipment (UE) includes means for performing, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; means for predicting, during the first synchronization wakeup period while the RF circuitry and the FW circuitry are in the active state, a second SSBS at which to wake up for a second synchronization wakeup period based on the one or more measurements; means for performing, during the first synchronization wakeup period while the RF circuitry and the FW circuitry are in the active state, one or more FW post-processing operations based on the one or more measurements; means for transitioning the RF circuitry and the FW circuitry from the active state to a sleep state in response to completion of the one or more FW post-processing operations; and means for determining, during the first synchronization wakeup period while the RF circuitry and the FW circuitry are in the sleep state, a wakeup time associated with the second SSBS for the second synchronization wakeup period.

In some aspects, the method includes means for performing, during the first synchronization wakeup period while the RF circuitry and the FW circuitry are in the sleep state, one or more software (SW) post-processing operations based on the one or more measurements.

In some aspects, the method includes means for performing, during the first synchronization wakeup period while the RF circuitry and the FW circuitry are in the active state and prior to the one or more measurements, one or more FW pre-processing operations, one or more software (SW) pre-processing operations, or a combination thereof.

In some aspects, the second SSBS corresponds to a next available SSBS opportunity from the base station subsequent to the first SSBS.

In some aspects, one or more SSBS opportunities from the base station are available between the first SSBS and the second SSBS.

In some aspects, the one or more measurements comprise one or more signal-to-noise ratio (SNR) measurements.

In some aspects, the method includes means for determining a relationship between the one or more measurements and one or more performance thresholds, wherein the prediction of the second SSBS is selectively performed based upon the relationship.

In some aspects, the one or more performance thresholds are based on an operational mode of the UE.

In some aspects, the prediction of the second SSBS is selectively performed based a mobility parameter associated with the UE.

In an aspect, a non-transitory computer-readable medium storing computer-executable instructions that, when executed by a user equipment (UE), cause the UE to: perform, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predict, during the first synchronization wakeup period while the RF circuitry and the FW circuitry are in the active state, a second SSBS at which to wake up for a second synchronization wakeup period based on the one or more measurements; perform, during the first synchronization wakeup period while the RF circuitry and the FW circuitry are in the active state, one or more FW post-processing operations based on the one or more measurements; transition the RF circuitry and the FW circuitry from the active state to a sleep state in response to completion of the one or more FW post-processing operations; and determine, during the first synchronization wakeup period while the RF circuitry and the FW circuitry are in the sleep state, a wakeup time associated with the second SSBS for the second synchronization wakeup period.

In some aspects, the one or more instructions further cause the UE to: perform, during the first synchronization wakeup period while the RF circuitry and the FW circuitry are in the sleep state, one or more software (SW) post-processing operations based on the one or more measurements.

In some aspects, the one or more instructions further cause the UE to: perform, during the first synchronization wakeup period while the RF circuitry and the FW circuitry are in the active state and prior to the one or more measurements, one or more FW pre-processing operations, one or more software (SW) pre-processing operations, or a combination thereof.

In some aspects, the second SSBS corresponds to a next available SSBS opportunity from the base station subsequent to the first SSBS.

In some aspects, one or more SSBS opportunities from the base station are available between the first SSBS and the second SSBS.

In some aspects, the one or more measurements comprise one or more signal-to-noise ratio (SNR) measurements.

In some aspects, the one or more instructions further cause the UE to: determine a relationship between the one or more measurements and one or more performance thresholds, wherein the prediction of the second SSBS is selectively performed based upon the relationship.

In some aspects, the one or more performance thresholds are based on an operational mode of the UE.

In some aspects, the prediction of the second SSBS is selectively performed based a mobility parameter associated with the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
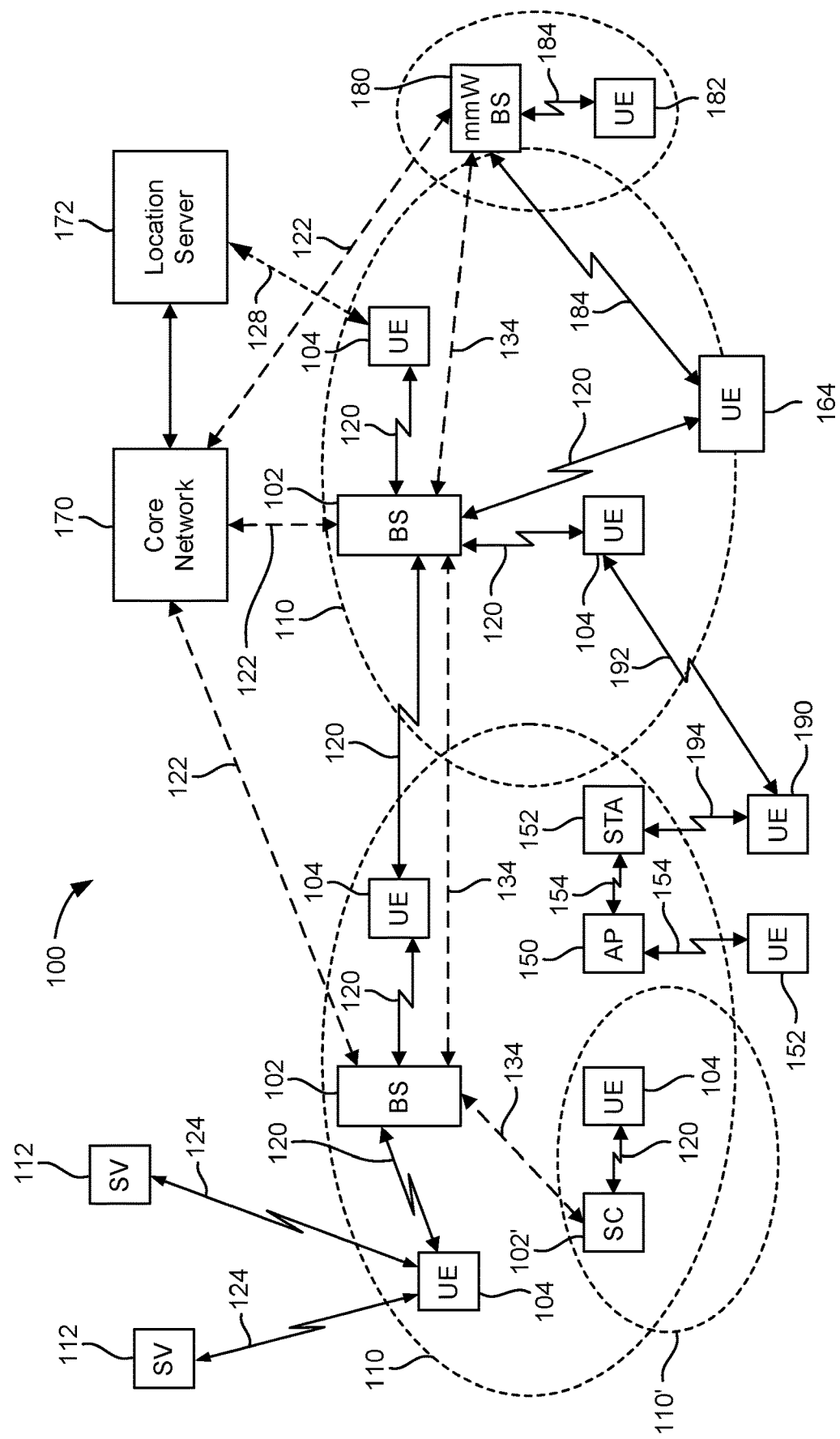
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
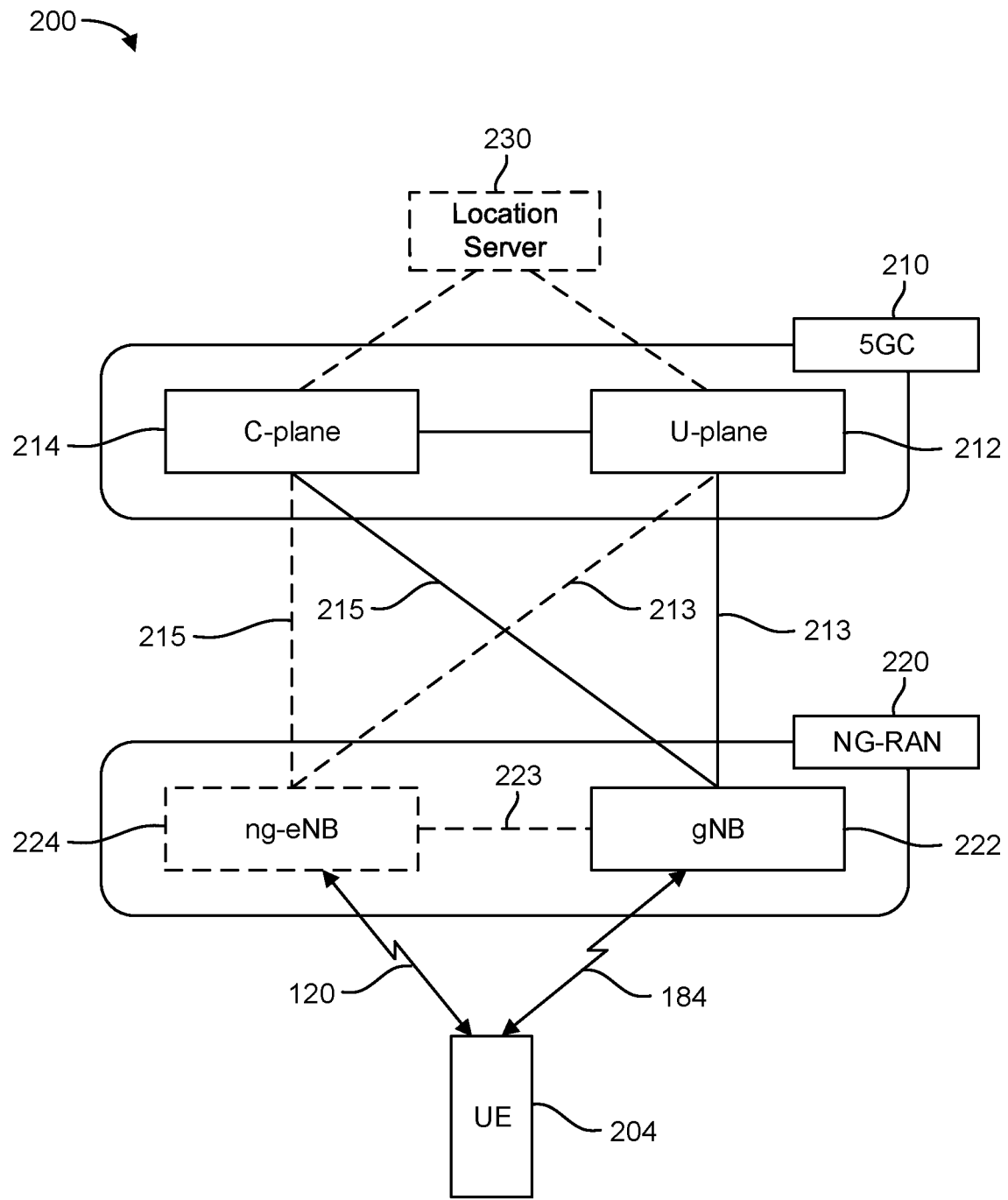
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
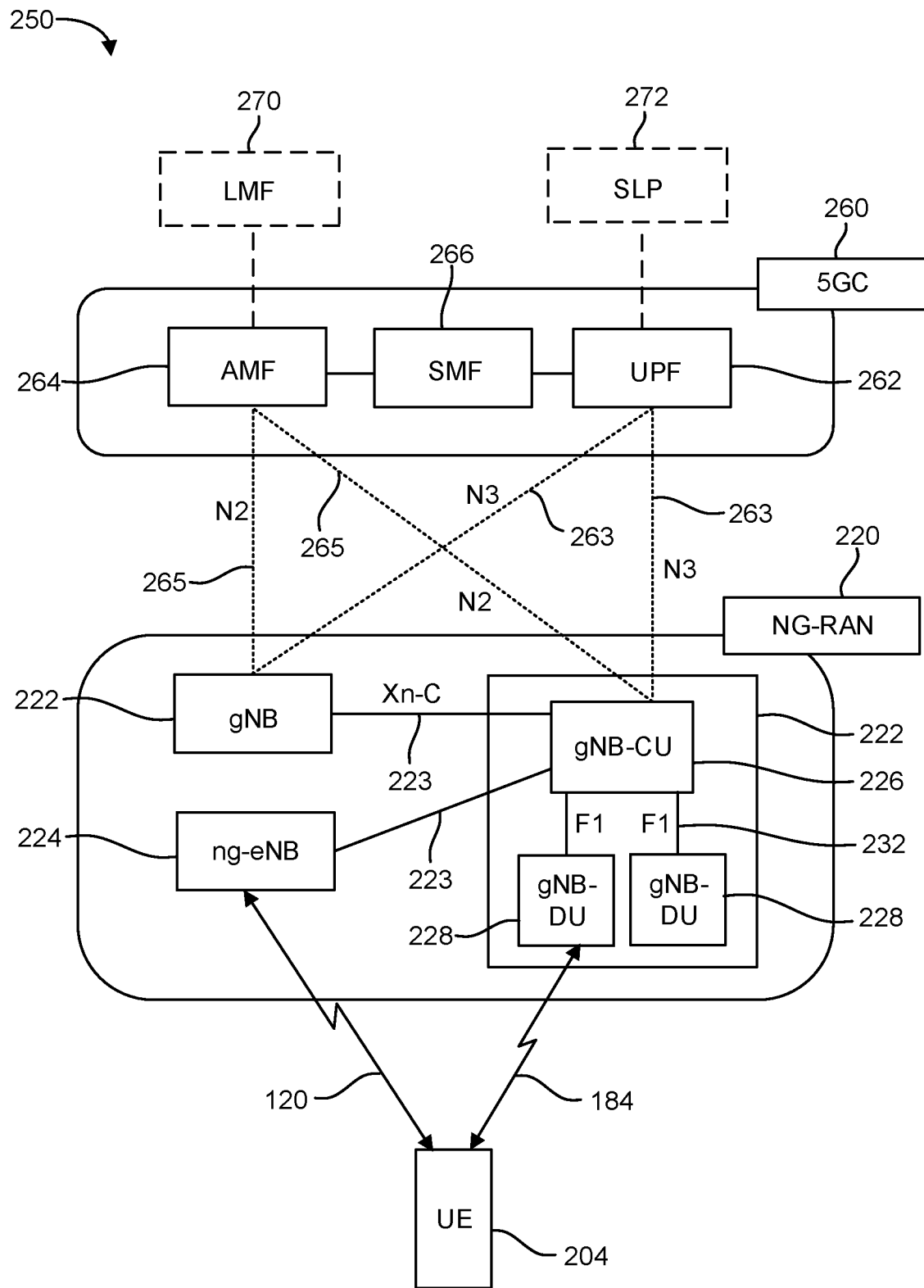

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
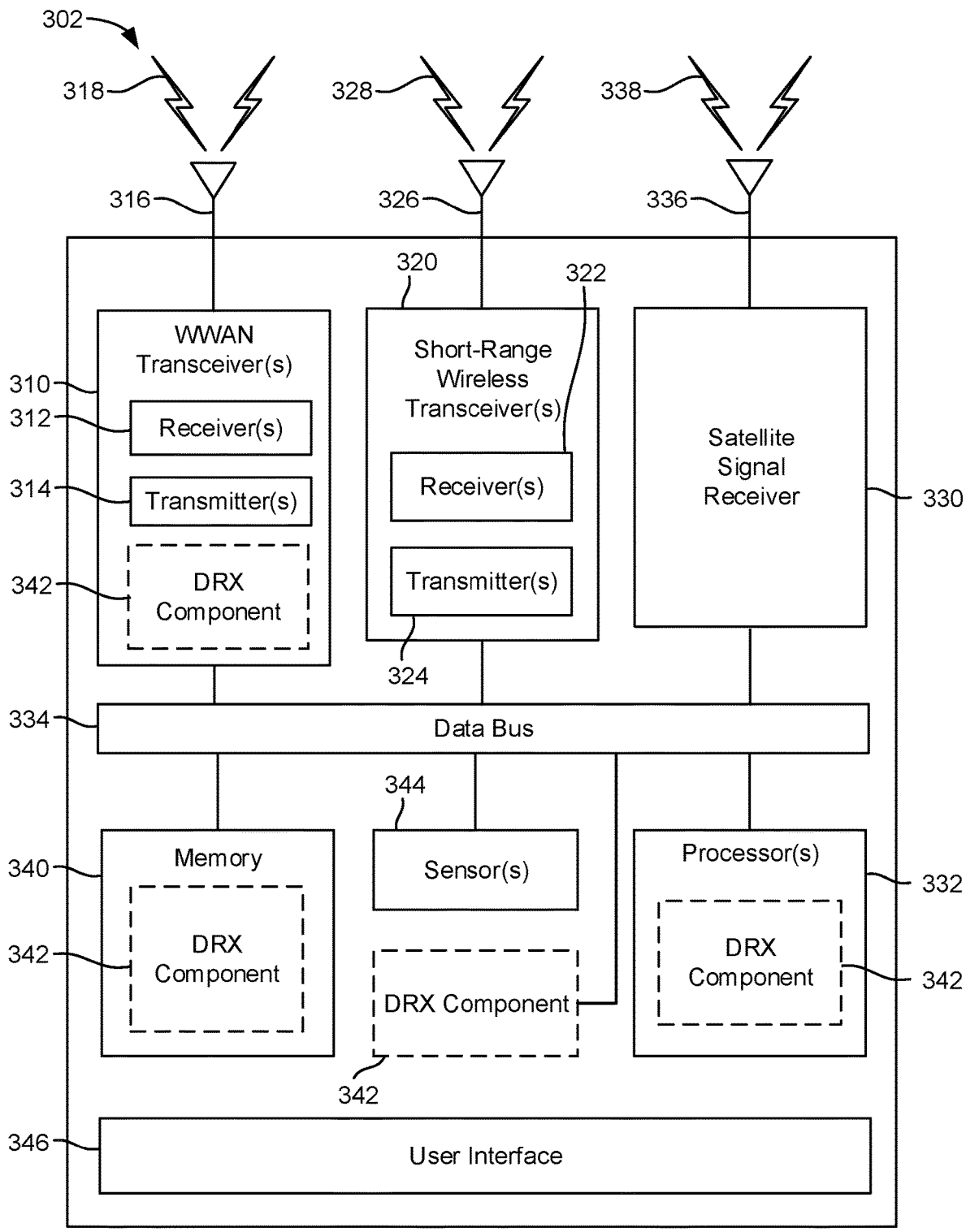
FIGS. 3A, 3B, and 3C are simplified block diagrams of several sample aspects of components that may be employed in a user equipment (UE), a base station, and a network entity, respectively, and configured to support communications as taught herein.
Figure 3B:
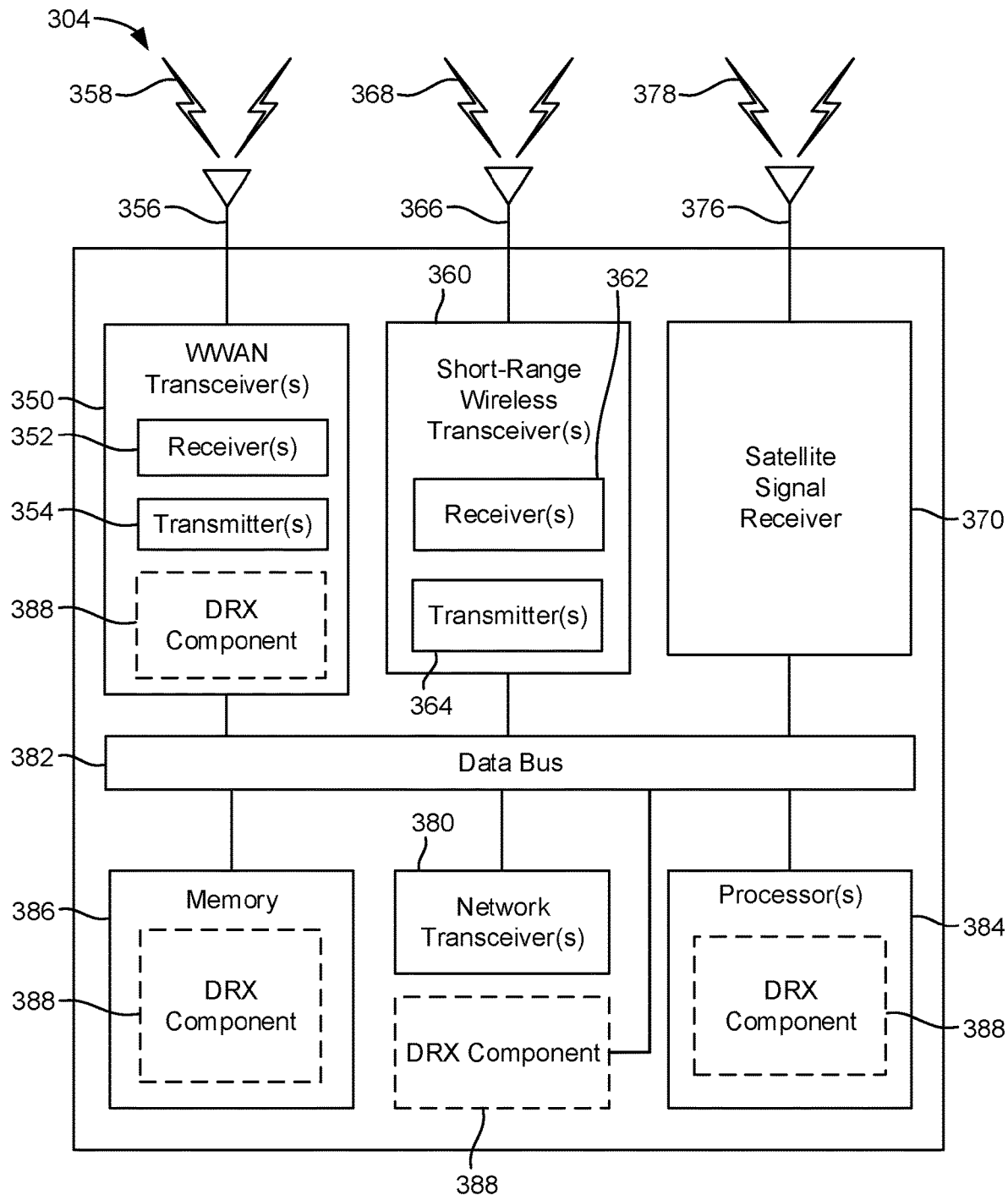
Figure 3C:
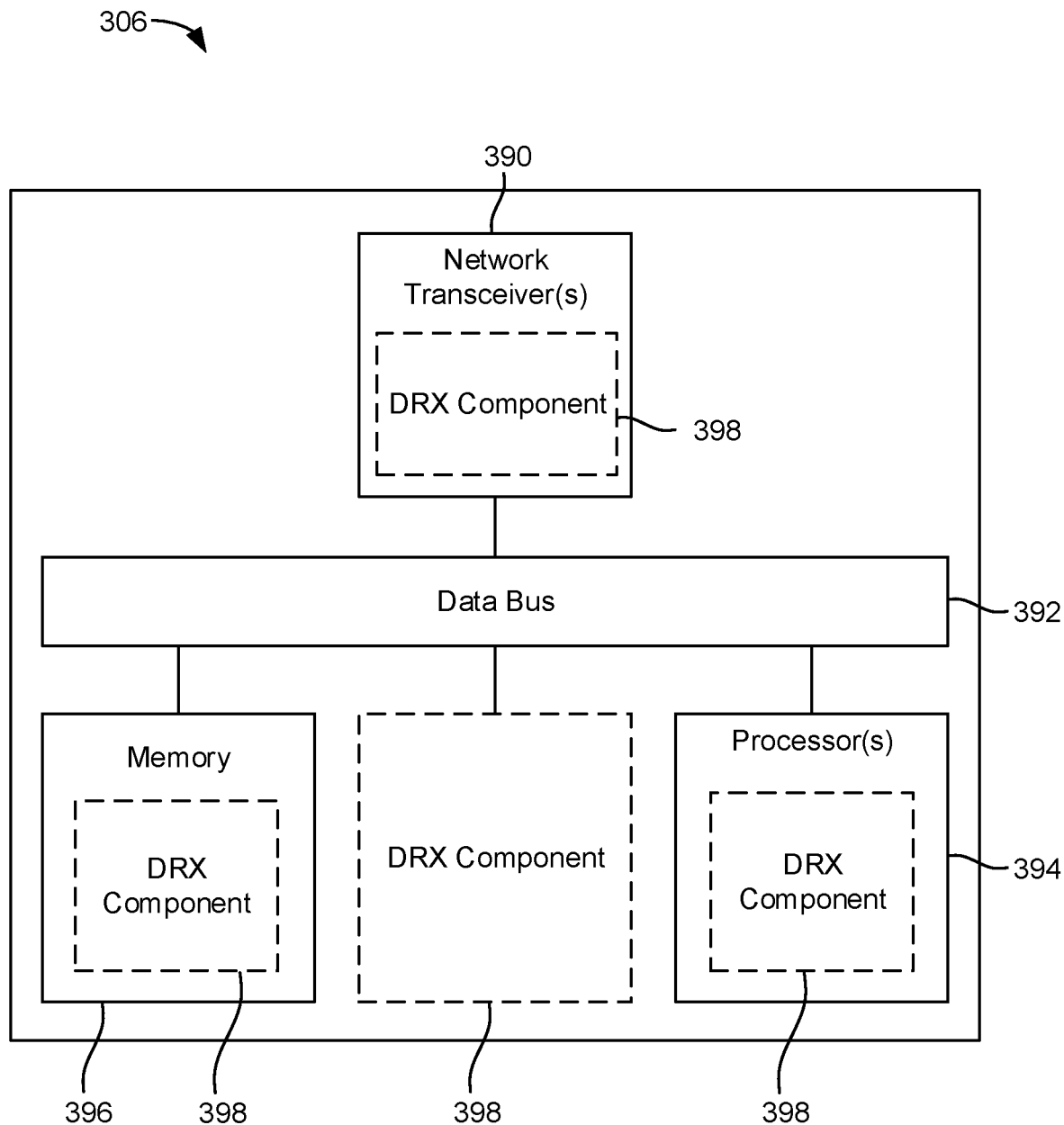

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include DRX component 342, 388, and 398, respectively. The DRX component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the DRX component 342, 388, and 398 may be external to the processors 332, 384, and 394 (e.g., part of a modem processing system, integrated with another processing system, etc.). Alternatively, the DRX component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the DRX component 342, which may be, for example, part of the one or more WWAN transceivers 310, the memory 340, the one or more processors 332, or any combination thereof, or may be a standalone component. FIG. 3B illustrates possible locations of the DRX component 388, which may be, for example, part of the one or more WWAN transceivers 350, the memory 386, the one or more processors 384, or any combination thereof, or may be a standalone component. FIG. 3C illustrates possible locations of the DRX component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the DRX component 342, 388, and 398, etc.

In some designs, the network entity 306 may be implemented as a core network component. In other designs, network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Even when there is no traffic being transmitted from the network to a UE, the UE is expected to monitor every downlink subframe on the physical downlink control channel (PDCCH). This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) and/or connected-mode discontinuous reception (CDRX) techniques. DRX and CDRX are mechanisms in which a UE goes into a "sleep" mode for a scheduled periods of time and "wakes up" for other periods of time. During the wake, or active, periods, the UE checks to see if there is any data coming from the network, and if there is not, goes back into sleep mode.

To implement DRX and CDRX, the UE and the network need to be synchronized. In a worst-case scenario, the network may attempt to send some data to the UE while the UE is in sleep mode, and the UE may wake up when there is no data to be received. To prevent such scenarios, the UE and the network should have a well-defined agreement about when the UE can be in sleep mode and when the UE should be awake/active. This agreement has been standardized in various technical specifications. Note that DRX includes CDRX, and thus, references to DRX refer to both DRX and CDRX, unless otherwise indicated.

The network (e.g., serving cell) can configure the UE with the DRX/CDRX timing using an RRC Connection Reconfiguration message (for CDRX) or an RRC Connection Setup message (for DRX). The network can signal the following DRX configuration parameters to the UE. (1) DRX Cycle: The duration of one 'ON time' plus one 'OFF time.' This value is not explicitly specified in RRC messages; rather, it is calculated by the subframe/slot time and "long DRX cycle start offset." (2) ON Duration Timer: The duration of 'ON time' within one DRX cycle. (3) DRX Inactivity Timer: How long a UE should remain 'ON' after the reception of a PDCCH. When this timer is on, the UE remains in the 'ON state,' which may extend the ON period into the period that would be the 'OFF' period otherwise. (4) DRX Retransmission Timer: The maximum number of consecutive PDCCH subframes/slots a UE should remain active to wait for an incoming retransmission after the first available retransmission time. (5) Short DRX Cycle: A DRX cycle that can be implemented within the 'OFF' period of a long DRX cycle. (6) DRX Short Cycle Timer: The consecutive number of subframes/slots that should follow the short DRX cycle after the DRX inactivity timer has expired.

Figure 4A:
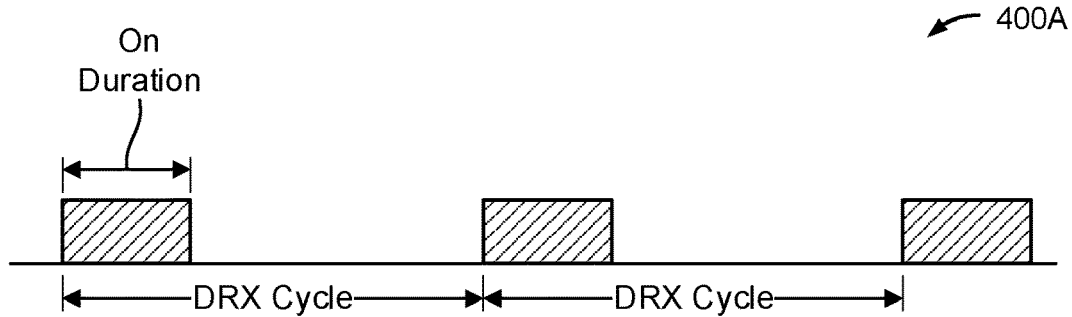
FIGS. 4A to 4C illustrate example discontinuous reception (DRX) configurations, according to aspects of the disclosure.
Figure 4B:
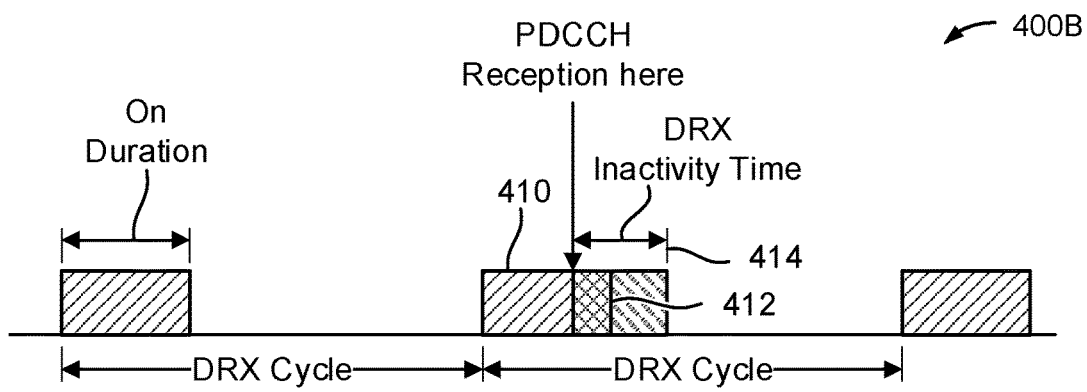
Figure 4C:
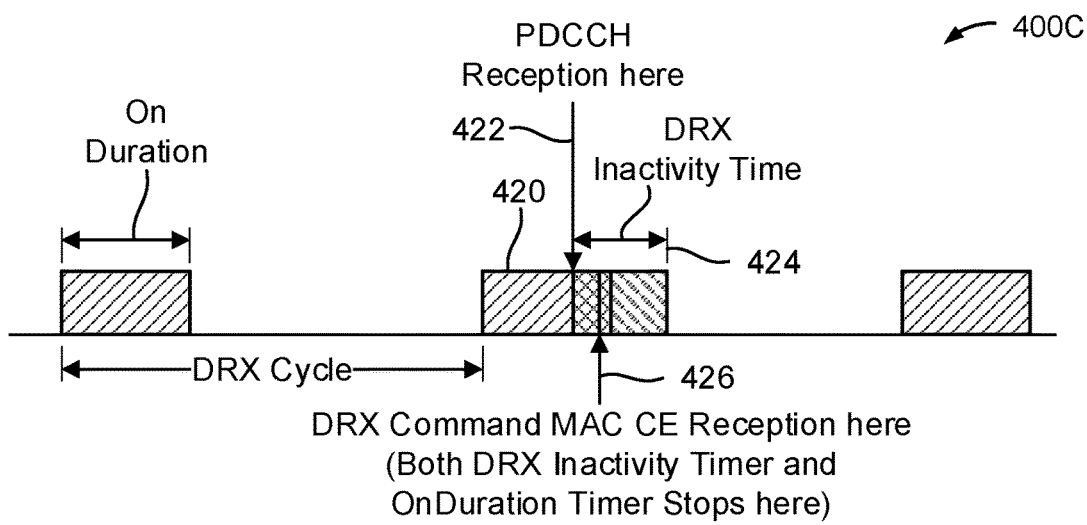

FIGS. 4A to 4C illustrate example DRX configurations, according to aspects of the disclosure. FIG. 4A illustrates an example DRX configuration 400A in which a long DRX cycle (the time from the start of one ON duration to the start of the next ON duration) is configured and no PDCCH is received during the cycle. FIG. 4B illustrates an example DRX configuration 400B in which a long DRX cycle is configured and a PDCCH is received during an ON duration 410 of the second DRX cycle illustrated. Note that the ON duration 410 ends at time 412. However, the time that the UE is awake/active (the "active time") is extended to time 414 based on the length of the DRX inactivity timer and the time at which the PDCCH is received. Specifically, when the PDCCH is received, the UE starts the DRX inactivity timer and stays in the active state until the expiration of that timer (which is reset each time a PDCCH is received during the active time).

FIG. 4C illustrates an example DRX configuration 400C in which a long DRX cycle is configured and a PDCCH and a DRX command MAC control element (MAC-CE) are received during an ON duration 420 of the second DRX cycle illustrated. Note that the active time beginning during ON duration 420 would normally end at time 424 due to the reception of the PDCCH at time 422 and the subsequent expiration of the DRX inactivity timer at time 424, as discussed above with reference to FIG. 4B. However, in the example of FIG. 4C, the active time is shortened to time 426 based on the time at which the DRX command MAC-CE, which instructs the UE to terminate the DRX inactivity timer and the ON duration timer, is received.

In greater detail, the active time of a DRX cycle is the time during which the UE is considered to be monitoring the PDCCH. The active time may include the time during which the ON duration timer is running, the DRC inactivity timer is running, the DRX retransmission timer is running, the MAC contention resolution timer is running, a scheduling request has been sent on the PUCCH and is pending, an uplink grant for a pending HARQ retransmission can occur and there is data in the corresponding HARQ buffer, or a PDCCH indicating a new transmission addressed to the cell radio network temporary identifier (C-RNTI) of the UE has not been received after successful reception of a random access response (RAR) for the preamble not selected by the UE. And, in non-contention-based random access, after receiving the RAR, the UE should be in an active state until the PDCCH indicating new transmission addressed to the C-RNTI of the UE is received.

In 5G-NR it is important for UE to improve power consumption as much as possible, without sacrificing performance. In some designs, when the network configures CDRX, UE usually goes to long duration sleep (e.g., 18 ms DRX cycles for deep sleep) to save power during CDRX OFF duration. In order keep a good decoding rate of DL/UL channel at CDRX ON and maintain UE mobility, UE may occasionally wake up to do search, measurement, and loop in CDRX, which may be referred to as a synchronization wakeup period. Based on the sleep duration, UE can choose to enter light sleep state or deep sleep state.

Figure 5:
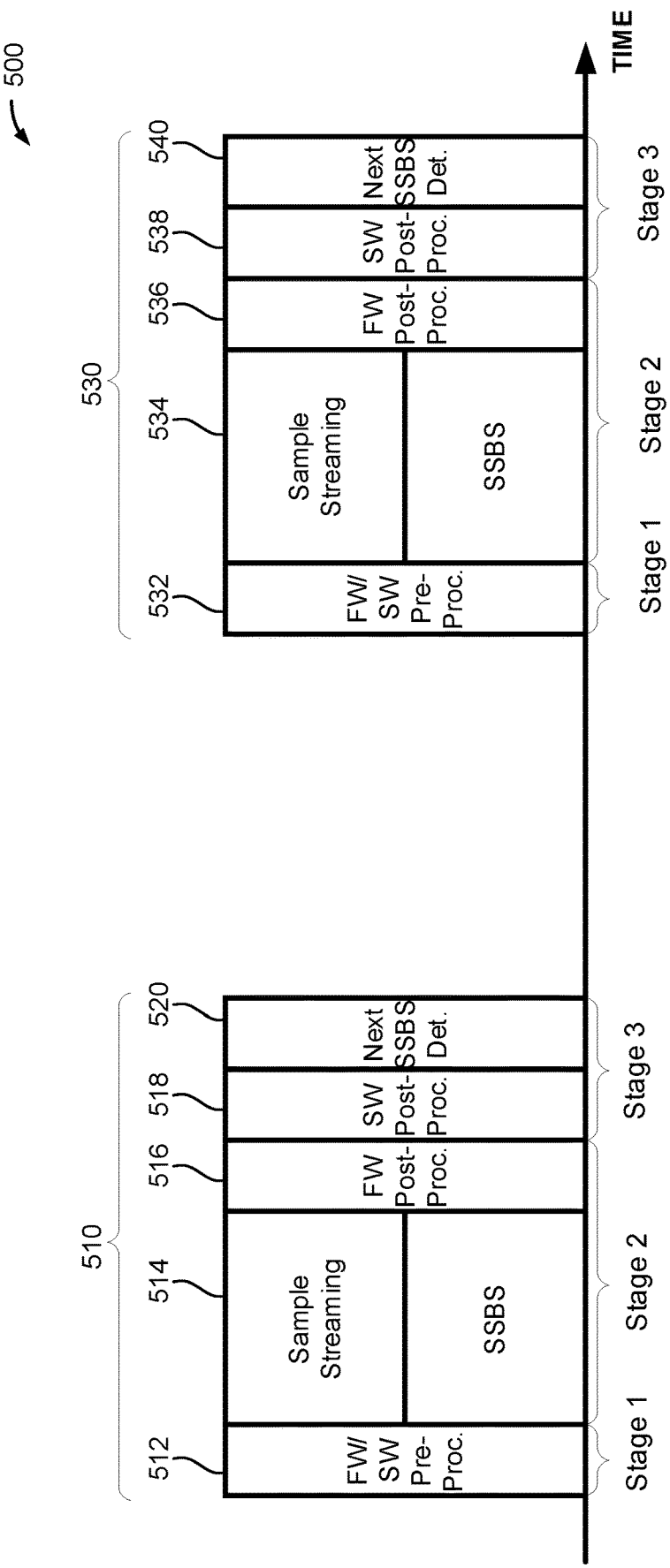
FIG. 5 illustrates a synchronization wakeup period sequence in accordance with aspects of the disclosure.

FIG. 5 illustrates a synchronization wakeup period sequence 500 in accordance with aspects of the disclosure. As noted above, synchronization wakeup periods may be implemented to maintain a suitable level of synchronization during a sleep state (or DRX OFF period).

Referring to FIG. 5, a first synchronization wakeup period is depicted at 510. At 512, the UE wakes up RF circuitry and firmware (FW) circuitry (e.g., which may be part of transceiver circuitry, such as 310 or 320 of FIG. 3A) and (if necessary) an application processor and performs FW pre-processing and software (SW) pre-processing. The FW and SW pre-processing at 512 may be characterized as a first stage of a three-stage processing sequence for the first synchronization wakeup period 510. At 514, the UE performs measurements of synchronization signal blocks (SSBs) of a first synchronization signal burst set (SSBS) from a base station (e.g., SNR measurements, etc.), or sample streaming. At 516, the UE performs FW post-processing on the SSB samples or measurements. 514-516 may be characterized as a second stage of the three-stage processing sequence for the first synchronization wakeup period 510. The second stage involves active use of the RF circuitry and the FW circuitry as noted above. At 518, the UE performs SW post-processing. At 520, the UE determines a next SSBS for a next synchronization wakeup period, and an associated wakeup time. For example, the measurement(s) from 514 may be used in part to select the next synchronization wakeup period. 518-520 may be characterized as a third stage of the three-stage processing sequence for the first synchronization wakeup period 510.

Referring to FIG. 5, a second synchronization wakeup period is depicted at 530. At 532, the UE wakes up RF circuitry and the FW circuitry (e.g., which may be part of transceiver circuitry, such as 310 or 320 of FIG. 3A) and (if necessary) an application processor and performs FW pre-processing and SW pre-processing. For example, the wakeup time at 532 may correspond to the determined wakeup time from 520. The FW and SW pre-processing at 532 may be characterized as a first stage of a three-stage processing sequence for the second synchronization wakeup period 530. At 534, the UE performs measurements of SSBs of a second SSBS from the base station (e.g., SNR measurements, etc.), or sample streaming. At 536, the UE performs FW post-processing on the SSB samples or measurements. 534-536 may be characterized as a second stage of the three-stage processing sequence for the second synchronization wakeup period 530. The second stage involves active use of the RF circuitry and the FW circuitry as noted above. At 538, the UE performs SW post-processing. At 540, the UE determines a next SSBS for a next synchronization wakeup period, and an associated wakeup time. For example, the measurement(s) from 534 may be used in part to select the next synchronization wakeup period. 538-540 may be characterized as a third stage of the three-stage processing sequence for the second synchronization wakeup period 530.

In some designs, the FW circuitry and the RF circuitry may remain active during the third stage of the three-stage processing sequence of the synchronization wakeup period depicted in FIG. 5, and may only return to a sleep state the three-stage processing sequence is completed (i.e., after the determination at 520 or 540). The third stage of the three-stage processing sequence may take a significant amount of time (e.g., 1-5 ms). Aspects of the disclosure are thereby directed to an early sleep state for RF circuitry and the FW circuitry during a synchronization wakeup period. In some aspects, the RF circuitry and the FW circuitry may enter the sleep state after completion of the second stage of the three-stage processing sequence rather than the third stage as in FIG. 5. Such aspects may provide various technical advantages, such as reduced power consumption at the UE.

Figure 6:
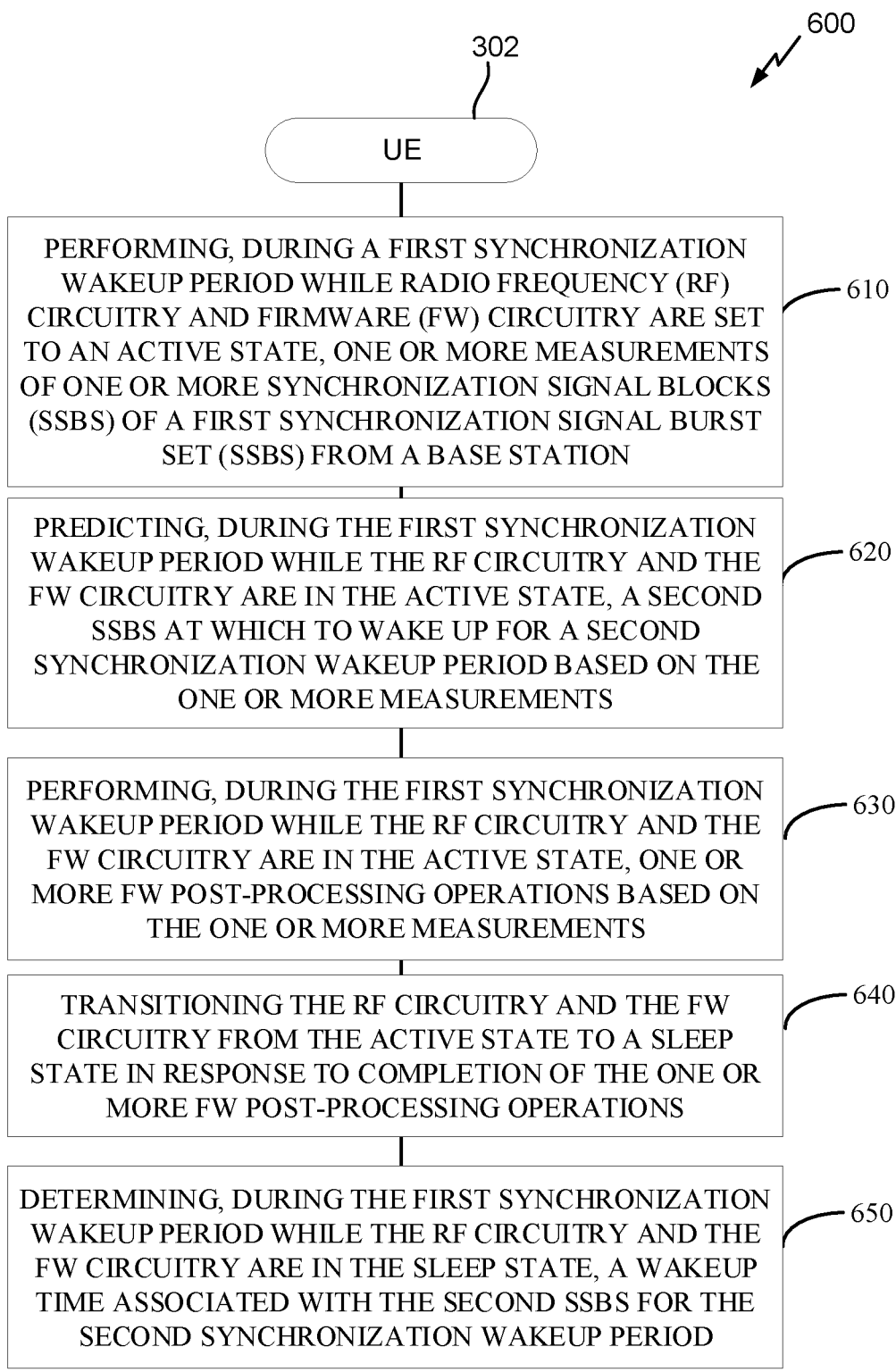
FIG. 6 illustrates an exemplary process of communications according to an aspect of the disclosure.

FIG. 6 illustrates an exemplary process 600 of communications according to an aspect of the disclosure. The process 600 of FIG. 6 is performed by a UE, such as UE 302.

Referring to FIG. 6, at 610, UE 302 (e.g., processor(s) 332, DRX component 342, receiver 312 or 322, etc.) performs, during a first synchronization wakeup period while RF circuitry and the FW circuitry are set to an active state, one or more measurements (e.g., SNR, etc.) of one or more SSBs of a first SSBS from a base station.

Referring to FIG. 6, at 620, UE 302 (e.g., processor(s) 332, DRX component 342, etc.) predicts, during the first synchronization wakeup period while the RF circuitry and the FW circuitry are in the active state, a second SSBS at which to wake up for a second synchronization wakeup period based on the one or more measurements. In some designs, the prediction of 620 may be implemented during a second stage of a three-stage processing sequence for the first synchronization wakeup period (e.g., rather than the third stage of the three-stage processing sequence as in FIG.

5), as will be described below in more detail. In some designs, the prediction at 620 may be somewhat less reliable than waiting until the third stage of the three-stage processing sequence as in FIG. 5, in which case the prediction at 620 may be performed in a selective manner (e.g., perform prediction only if measurement(s) indicate a stable channel environment, otherwise, do not perform prediction and instead default to operation as in FIG. 5, etc.), as will be described below in more detail.

Referring to FIG. 6, at 630, UE 302 (e.g., processor(s) 332, DRX component 342, etc.) performs, during the first synchronization wakeup period while the RF circuitry and the FW circuitry are in the active state, one or more FW post-processing operations based on the one or more measurements.

Referring to FIG. 6, at 640, UE 302 (e.g., processor(s) 332, DRX component 342, transceiver(s) 310 or 320, etc.) transitions the RF circuitry and the FW circuitry from the active state to a sleep state in response to completion of the one or more FW post-processing operations. For example, rather than maintaining the RF circuitry and the FW circuitry in an active state during a third stage of the three-stage processing sequence for the first synchronization wakeup period, UE 302 may instead turn off or disable the RF circuitry and the FW circuitry after completion of the second stage of the three-stage processing sequence for the first synchronization wakeup period.

Referring to FIG. 6, at 650, UE 302 (e.g., processor(s) 332, DRX component 342, etc.) determines, during the first synchronization wakeup period while the RF circuitry and the FW circuitry are in the sleep state, a wakeup time associated with the second SSBS for the second synchronization wakeup period. For example, in FIG. 5, the next SSBS and its associated wakeup time are both determined at 520 or 540. However, in FIG. 6, the next SSBS is predicted at 620 (e.g., in second stage of three-stage processing sequence for the first synchronization wakeup period while the RF circuitry and the FW circuitry are in active state) and the actual wakeup time at which to wakeup for the predicted next SSBS is determined later at 650 (e.g., in third stage of three-stage processing sequence for the first synchronization wakeup period while the RF circuitry and the FW circuitry are in sleep state, thereby conserving power at UE 302).

Referring to FIG. 6, in some designs, UE 302 may perform, during the first synchronization wakeup period while the RF circuitry and the FW circuitry are in the sleep state, one or more SW post-processing operations based on the one or more measurements (e.g., in third stage of three-stage processing sequence for the first synchronization wakeup period).

Referring to FIG. 6, in some designs, UE 302 may perform, during the first synchronization wakeup period while the RF circuitry and the FW circuitry are in the active state and prior to the one or more measurements, one or more FW pre-processing operations, one or more SW pre-processing operations, or a combination thereof (e.g., in first stage of three-stage processing sequence for the first synchronization wakeup period).

Referring to FIG. 6, in some designs, the second SSBS may correspond to a next available SSBS opportunity from the base station subsequent to the first SSBS. For example, if the UE is in an unstable channel environment, the UE may decide not to skip any SSBS opportunities so as to maintain better synchronization with network (e.g., better synchronization, albeit with more power consumption). In other designs, one or more SSBS opportunities from the base station may be available between the first SSBS and the second SSBS. In this case, these intervening SSBS opportunities may be skipped so as to conserve power at the UE (e.g., UE can skip some SSBS opportunities to save power if the UE is in a fairly stable channel environment).

Referring to FIG. 6, in some designs, the one or more measurements comprise one or more SNR measurements. In some designs, as will be described below in more detail with respect to FIG. 8, a relationship between the one or more measurements and one or more performance thresholds (e.g., SNR threshold(s)), and the prediction of the second SSBS is selectively performed based upon the relationship. In some designs, the one or more performance thresholds are based on an operational mode of the UE (e.g., cell excellent mode, cell normal mode, or cell panic mode). In some designs, the prediction of the second SSBS is selectively performed based a mobility parameter associated with the UE (e.g., if UE is moving very fast or above speed threshold, then the channel environment of the UE may also be changing fast, which makes the prediction at 620 less reliable in which case the prediction at 620 can be skipped in favor of the more reliable but more power-intensive SSBS procedure where the RF circuitry and the FW circuitry is kept in active state during the third stage of the three-stage processing sequence for the first synchronization wakeup period.

Figure 7:
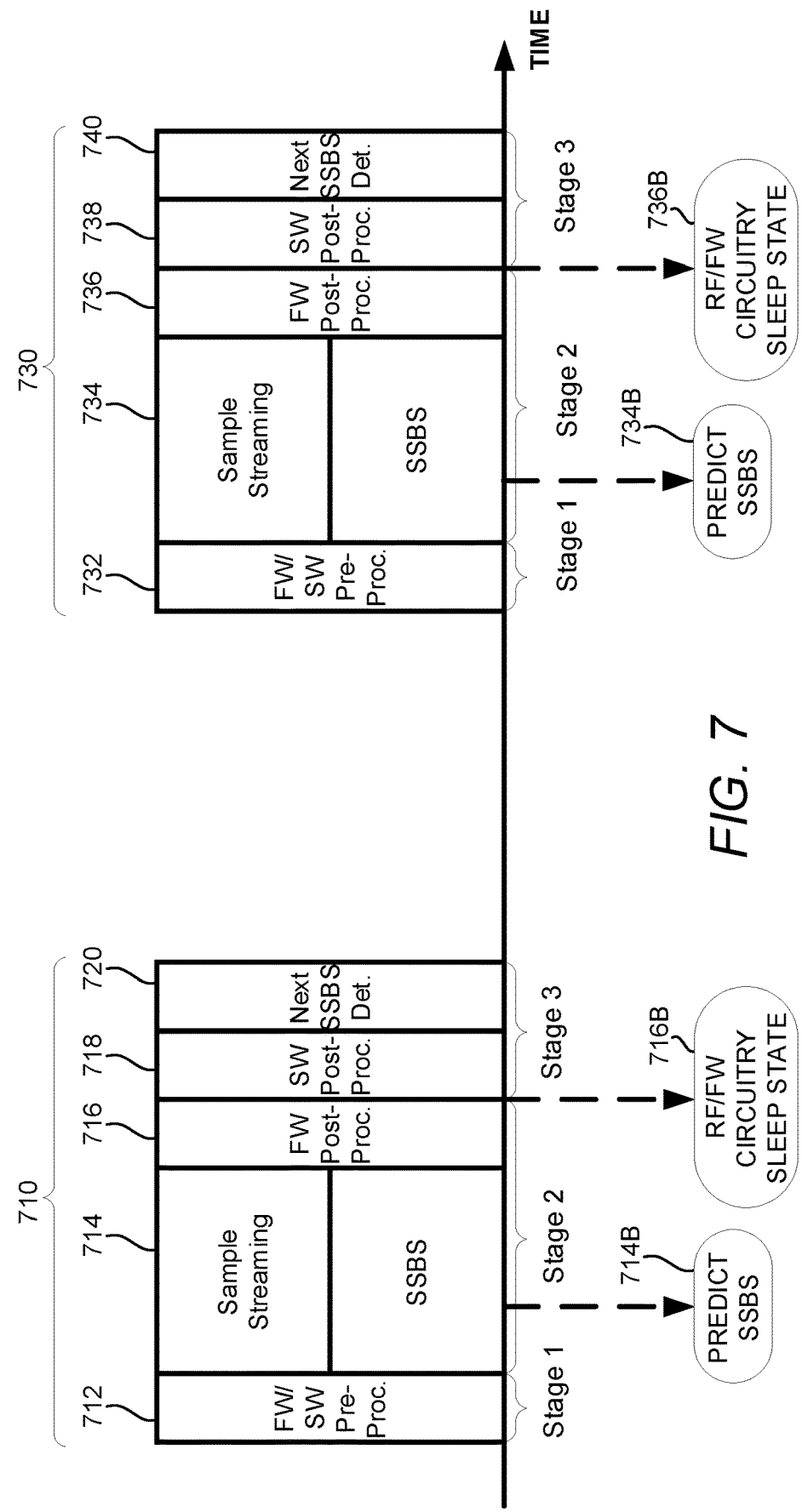
FIG. 7 illustrates a synchronization wakeup period sequence in accordance with aspects of the disclosure.

FIG. 7 illustrates a synchronization wakeup period sequence 700 in accordance with aspects of the disclosure. In particular, the synchronization wakeup period sequence 700 is based upon an example implementation of the process 600 of FIG. 6.

Referring to FIG. 7, a first synchronization wakeup period is depicted at 710. At 712, the UE wakes up RF circuitry and the FW circuitry (e.g., which may be part of transceiver circuitry, such as 310 or 320 of FIG. 3A) and (if necessary) an application processor and performs FW pre-processing and SW pre-processing. The FW and SW pre-processing at 712 may be characterized as a first stage of a three-stage processing sequence for the first synchronization wakeup period 710. At 714, the UE performs measurements of SSBs of a first SSBS from a base station (e.g., SNR measurements, etc.), or sample streaming. At 716, the UE performs FW post-processing on the SSB samples or measurements. Unlike FIG. 5, at some point during the sample streaming of 714, the UE collects sufficient measurement data (e.g., SNR measurements) to predict the next SSBS to be monitored to maintain network synchronization. For example, if the measurement data indicates a very stable channel environment, one or more SSBS opportunities may be skipped, while if the measurement data indicates a very unstable channel environment, the UE may determine to use more power and wakeup at the very next SSBS opportunity to keep the network synchronization more up-to-date. Hence, at 714B, the UE predicts the next SSBS. At 716, the UE performs FW post-processing on the SSB samples or measurements. At 716B, rather than keep the RF circuitry and the FW circuitry awake or active (and thereby consuming a high amount of power), the RF circuitry and the FW circuitry may instead be transitioned to a sleep state. 714-716B may be characterized as a second stage of the three-stage processing sequence for the first synchronization wakeup period 710. At 718, the UE performs SW post-processing. At 720, the UE determines a wakeup time for the predicted synchronization wakeup period from 714B. 718-720 may be characterized as a third stage of the three-stage processing sequence for the first synchronization wakeup period 710.

Referring to FIG. 7, a second synchronization wakeup period is depicted at 730. At 732, the UE wakes up RF circuitry and the FW circuitry (e.g., which may be part of transceiver circuitry, such as 310 or 320 of FIG. 3A) and (if necessary) an application processor and performs FW pre-processing and SW pre-processing. For example, the wakeup time at 732 may correspond to the determined wakeup time from 720. The FW and SW pre-processing at 732 may be characterized as a first stage of a three-stage processing sequence for the second synchronization wakeup period 730. At 734, the UE performs measurements of SSBs of a first SSBS from a base station (e.g., SNR measurements, etc.), or sample streaming. At 736, the UE performs FW post-processing on the SSB samples or measurements. Unlike FIG. 7, at some point during the sample streaming of 734, the UE collects sufficient measurement data (e.g., SNR measurements) to predict the next SSBS to be monitored to maintain network synchronization. For example, if the measurement data indicates a very stable channel environment, one or more SSBS opportunities may be skipped, while if the measurement data indicates a very unstable channel environment, the UE may determine to use more power and wakeup at the very next SSBS opportunity to keep the network synchronization more up-to-date. Hence, at 734B, the UE predicts the next SSBS. At 736, the UE performs FW post-processing on the SSB samples or measurements. At 736B, rather than keep the RF circuitry and the FW circuitry awake or active (and thereby consuming a high amount of power), the RF circuitry and the FW circuitry may instead be transitioned to a sleep state. 734-736B may be characterized as a second stage of the three-stage processing sequence for the second synchronization wakeup period 730. At 738, the UE performs SW post-processing. At 740, the UE determines a wakeup time for the predicted synchronization wakeup period from 734B. 738-740 may be characterized as a third stage of the three-stage processing sequence for the second synchronization wakeup period 730.

Figure 8:
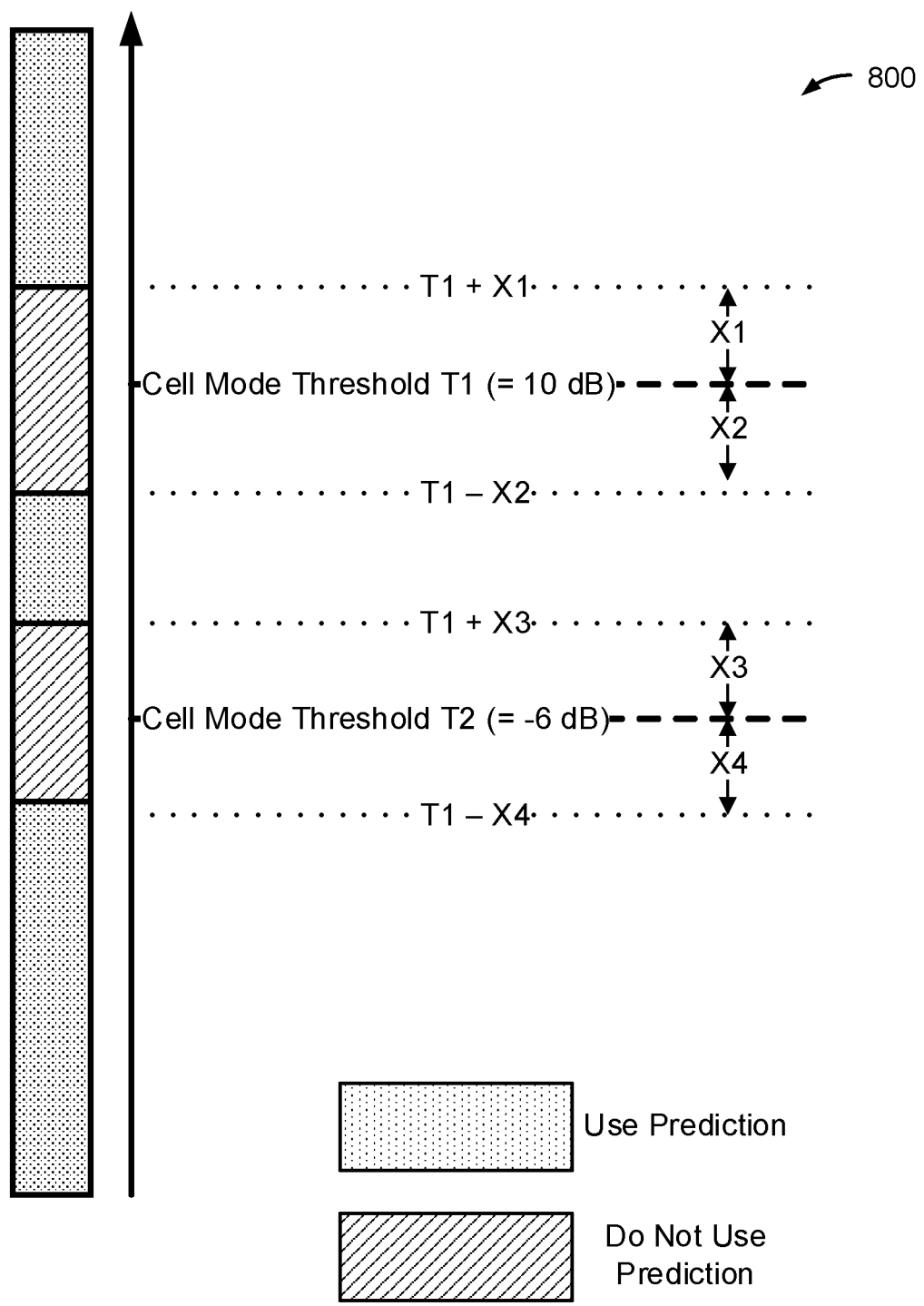
FIG. 8 illustrates an example implementation of the process of FIG. 6 in accordance with aspects of the disclosure.

FIG. 8 illustrates an example implementation 800 of the process 600 of FIG. 6 in accordance with aspects of the disclosure. As noted above, the prediction at 620 of FIG. 6 may be performed in a selective manner (e.g., based on channel conditions and/or cell mode stability). In some designs, the UE may be operating in accordance with one of three modes, denoted as Cell Excellent Mode, Cell Normal Mode, and Cell Panic Mode. Each respective operating mode may be associated with SNR threshold(s) which may be denoted as T1 (e.g., upper threshold, such as 10 dB) and T2 (e.g., lower threshold, such as −6 dB), e.g.:

Cell Excellent Mode: SNR>10 dB,
Cell Normal Mode: 10 dB>=SNR>=−6 dB
Cell Panic Mode: −6 dB>SNR In some designs, the respective SNR threshold(s) may further be associated with offsets, which may be denoted as X1, X2, X3 and X4. In some designs, the prediction at 620 of FIG. 6 may be implemented selectively only if the measured SNR is more than an offset (X1-X4) away from SNR threshold(s) associated with a current operating mode of the UE. Hence, in some designs, if the UE is in Cell Excellent Mode, then the prediction at 620 may be performed only if SNR>T1+X1, if the UE is in Cell Normal Mode, then the prediction at 620 may be performed only if T1−X2>SNR>T1+X3, and if the UE is in Cell Panic Mode, then the prediction at 620 may be performed only if T1−X4>SNR. In other words, if there is a likelihood of a potential mode change, then the prediction at 620 may be skipped (e.g., because there may be a higher chance of a prediction miss, which may cause a power penalty at the UE).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: performing, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predicting, during the first synchronization wakeup period while the RF circuitry and the FW circuitry are in the active state, a second SSBS at which to wake up for a second synchronization wakeup period based on the one or more measurements; performing, during the first synchronization wakeup period while the RF circuitry and the FW circuitry are in the active state, one or more FW post-processing operations based on the one or more measurements; transitioning the RF circuitry and the FW circuitry from the active state to a sleep state in response to completion of the one or more FW post-processing operations; and determining, during the first synchronization wakeup period while the RF circuitry and the FW circuitry are in the sleep state, a wakeup time associated with the second SSBS for the second synchronization wakeup period.

Clause 2. The method of clause 1, further comprising: performing, during the first synchronization wakeup period while the RF circuitry and the FW circuitry are in the sleep state, one or more software (SW) post-processing operations based on the one or more measurements.

Clause 3. The method of any of clauses 1 to 2, further comprising: performing, during the first synchronization wakeup period while the RF circuitry and the FW circuitry are in the active state and prior to the one or more measurements, one or more FW pre-processing operations, one or more software (SW) pre-processing operations, or a combination thereof.

Clause 4. The method of any of clauses 1 to 3, wherein the second SSBS corresponds to a next available SSBS opportunity from the base station subsequent to the first SSBS.

Clause 5. The method of any of clauses 1 to 4, wherein one or more SSBS opportunities from the base station are available between the first SSBS and the second SSBS.

Clause 6. The method of any of clauses 1 to 5, wherein the one or more measurements comprise one or more signal-to-noise ratio (SNR) measurements.

Clause 7. The method of any of clauses 1 to 6, further comprising: determining a relationship between the one or more measurements and one or more performance thresholds, wherein the prediction of the second SSBS is selectively performed based upon the relationship.

Clause 8. The method of clause 7, wherein the one or more performance thresholds are based on an operational mode of the UE.

Clause 9. The method of any of clauses 1 to 8, wherein the prediction of the second SSBS is selectively performed based a mobility parameter associated with the UE.

Clause 10. A user equipment (UE), comprising: a memory; at least one transceiver; and at least one processor communicatively coupled to the memory and the at least one transceiver, the at least one processor configured to: perform, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predict, during the first synchronization wakeup period while the RF circuitry and the FW circuitry are in the active state, a second SSBS at which to wake up for a second synchronization wakeup period based on the one or more measurements; perform, during the first synchronization wakeup period while the RF circuitry and the FW circuitry are in the active state, one or more FW post-processing operations based on the one or more measurements; transition the RF circuitry and the FW circuitry from the active state to a sleep state in response to completion of the one or more FW post-processing operations; and determine, during the first synchronization wakeup period while the RF circuitry and the FW circuitry are in the sleep state, a wakeup time associated with the second SSBS for the second synchronization wakeup period.

Clause 11. The UE of clause 10, wherein the at least one processor is further configured to: perform, during the first synchronization wakeup period while the RF circuitry and the FW circuitry are in the sleep state, one or more software (SW) post-processing operations based on the one or more measurements.

Clause 12. The UE of any of clauses 10 to 11, wherein the at least one processor is further configured to: perform, during the first synchronization wakeup period while the RF circuitry and the FW circuitry are in the active state and prior to the one or more measurements, one or more FW pre-processing operations, one or more software (SW) pre-processing operations, or a combination thereof.

Clause 13. The UE of any of clauses 10 to 12, wherein the second SSBS corresponds to a next available SSBS opportunity from the base station subsequent to the first SSBS.

Clause 14. The UE of any of clauses 10 to 13, wherein one or more SSBS opportunities from the base station are available between the first SSBS and the second SSBS.

Clause 15. The UE of any of clauses 10 to 14, wherein the one or more measurements comprise one or more signal-to-noise ratio (SNR) measurements.

Clause 16. The UE of any of clauses 10 to 15, wherein the at least one processor is further configured to: determine a relationship between the one or more measurements and one or more performance thresholds, wherein the prediction of the second SSBS is selectively performed based upon the relationship.

Clause 17. The UE of clause 16, wherein the one or more performance thresholds are based on an operational mode of the UE.

Clause 18. The UE of any of clauses 10 to 17, wherein the prediction of the second SSBS is selectively performed based a mobility parameter associated with the UE.

Clause 19. A user equipment (UE), comprising: means for performing, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; means for predicting, during the first synchronization wakeup period while the RF circuitry and the FW circuitry are in the active state, a second SSBS at which to wake up for a second synchronization wakeup period based on the one or more measurements; means for performing, during the first synchronization wakeup period while the RF circuitry and the FW circuitry are in the active state, one or more FW post-processing operations based on the one or more measurements; means for transitioning the RF circuitry and the FW circuitry from the active state to a sleep state in response to completion of the one or more FW post-processing operations; and means for determining, during the first synchronization wakeup period while the RF circuitry and the FW circuitry are in the sleep state, a wakeup time associated with the second SSBS for the second synchronization wakeup period.

Clause 20. The UE of clause 19, further comprising: means for performing, during the first synchronization wakeup period while the RF circuitry and the FW circuitry are in the sleep state, one or more software (SW) post-processing operations based on the one or more measurements.

Clause 21. The UE of any of clauses 19 to 20, further comprising: means for performing, during the first synchronization wakeup period while the RF circuitry and the FW circuitry are in the active state and prior to the one or more measurements, one or more FW pre-processing operations, one or more software (SW) pre-processing operations, or a combination thereof.

Clause 22. The UE of any of clauses 19 to 21, wherein the second SSBS corresponds to a next available SSBS opportunity from the base station subsequent to the first SSBS.

Clause 23. The UE of any of clauses 19 to 22, wherein one or more SSBS opportunities from the base station are available between the first SSBS and the second SSBS.

Clause 24. The UE of any of clauses 19 to 23, wherein the one or more measurements comprise one or more signal-to-noise ratio (SNR) measurements.

Clause 25. The UE of any of clauses 19 to 24, further comprising: means for determining a relationship between the one or more measurements and one or more performance thresholds, wherein the prediction of the second SSBS is selectively performed based upon the relationship.

Clause 26. The UE of clause 25, wherein the one or more performance thresholds are based on an operational mode of the UE.

Clause 27. The UE of any of clauses 19 to 26, wherein the prediction of the second SSBS is selectively performed based a mobility parameter associated with the UE.

Clause 28. A non-transitory computer-readable medium storing computer-executable instructions that, when executed by a user equipment (UE), cause the UE to: perform, during a first synchronization wakeup period while radio frequency (RF) circuitry and firmware (FW) circuitry are set to an active state, one or more measurements of one or more synchronization signal blocks (SSBs) of a first synchronization signal burst set (SSBS) from a base station; predict, during the first synchronization wakeup period while the RF circuitry and the FW circuitry are in the active state, a second SSBS at which to wake up for a second synchronization wakeup period based on the one or more measurements; perform, during the first synchronization wakeup period while the RF circuitry and the FW circuitry are in the active state, one or more FW post-processing operations based on the one or more measurements; transition the RF circuitry and the FW circuitry from the active state to a sleep state in response to completion of the one or more FW post-processing operations; and determine, during the first synchronization wakeup period while the RF circuitry and the FW circuitry are in the sleep state, a wakeup time associated with the second SSBS for the second synchronization wakeup period.

Clause 29. The non-transitory computer-readable medium of clause 28, wherein the one or more instructions further cause the UE to: perform, during the first synchronization wakeup period while the RF circuitry and the FW circuitry are in the sleep state, one or more software (SW) post-processing operations based on the one or more measurements.

Clause 30. The non-transitory computer-readable medium of any of clauses 28 to 29, wherein the one or more instructions further cause the UE to: perform, during the first synchronization wakeup period while the RF circuitry and the FW circuitry are in the active state and prior to the one or more measurements, one or more FW pre-processing operations, one or more software (SW) pre-processing operations, or a combination thereof.

Clause 31. An apparatus comprising a memory, a transceiver, and a processor communicatively coupled to the memory and the transceiver, the memory, the transceiver, and the processor configured to perform a method according to any of clauses 1 to 30.

Clause 32. An apparatus comprising means for performing a method according to any of clauses 1 to 30.

Clause 33. A non-transitory computer-readable medium storing computer-executable instructions, the computer-executable comprising at least one instruction for causing a computer or processor to perform a method according to any of clauses 1 to 30.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    performing, during a first synchronization wakeup period while at least one processor, radio frequency (RF) circuitry and firmware (FW) circuitry are set to an active state, one or more measurements of one or more synchronization signal blocks (SSBs) of a first synchronization signal burst set (SSBS) from a wireless network component;
    predicting, during the first synchronization wakeup period while the at least one processor, the RF circuitry and the FW circuitry are in the active state, a second SSBS at which to wake up for a second synchronization wakeup period based on the one or more measurements;
    performing, during the first synchronization wakeup period while the at least one processor, the RF circuitry and the FW circuitry are in the active state, one or more FW post-processing operations based on the one or more measurements;
    transitioning the RF circuitry and the FW circuitry from the active state to a sleep state in response to completion of the one or more FW post-processing operations; and
    scheduling, by the at least one processor during the first synchronization wakeup period while the RF circuitry and the FW circuitry are in the sleep state and the at least one processor is in the active state, a wakeup time associated with the second SSBS for the second synchronization wakeup period.

2. The method of claim 1, further comprising:
    performing, during the first synchronization wakeup period while the RF circuitry and the FW circuitry are in the sleep state, one or more software (SW) post-processing operations based on the one or more measurements.

3. The method of claim 1, further comprising:
    performing, during the first synchronization wakeup period while the RF circuitry and the FW circuitry are in the active state and prior to the one or more measurements, one or more FW pre-processing operations, one or more software (SW) pre-processing operations, or a combination thereof.

4. The method of claim 1, wherein the second SSBS corresponds to a next available SSBS opportunity from the wireless network component subsequent to the first SSBS.

5. The method of claim 1, wherein one or more SSBS opportunities from the wireless network component are available between the first SSBS and the second SSB S.

6. The method of claim 1, wherein the one or more measurements comprise one or more signal-to-noise ratio (SNR) measurements.

7. The method of claim 1, further comprising:
    determining a relationship between the one or more measurements and one or more performance thresholds,
    wherein the prediction of the second SSBS is selectively performed based upon the relationship.

8. The method of claim 7, wherein the one or more performance thresholds are based on an operational mode of the UE.

9. The method of claim 1, wherein the prediction of the second SSBS is selectively performed based on a mobility parameter associated with the UE.

10. The method of claim 1, further comprising:
    transitioning the RF circuitry and the FW circuitry from the active state to the sleep state during the first synchronization wakeup period.

11. A user equipment (UE), comprising:
    a memory;
    at least one transceiver; and
    at least one processor communicatively coupled to the memory and the at least one transceiver, the at least one processor configured to:
    perform, during a first synchronization wakeup period while the at least one processor, radio frequency (RF) circuitry and firmware (FW) circuitry are set to an active state, one or more measurements of one or more synchronization signal blocks (SSBs) of a first synchronization signal burst set (SSBS) from a wireless network component;
    predict, during the first synchronization wakeup period while the at least one processor, the RF circuitry and the FW circuitry are in the active state, a second SSBS at which to wake up for a second synchronization wakeup period based on the one or more measurements;
    perform, during the first synchronization wakeup period while the at least one processor, the RF circuitry and the FW circuitry are in the active state, one or more FW post-processing operations based on the one or more measurements;
    transition the RF circuitry and the FW circuitry from the active state to a sleep state in response to completion of the one or more FW post-processing operations; and
    schedule, by the at least one processor during the first synchronization wakeup period while the RF circuitry and the FW circuitry are in the sleep state and the at least one processor is in the active state, a wakeup time associated with the second SSBS for the second synchronization wakeup period.

12. The UE of claim 11, wherein the at least one processor is further configured to:
    perform, during the first synchronization wakeup period while the RF circuitry and the FW circuitry are in the sleep state, one or more software (SW) post-processing operations based on the one or more measurements.

13. The UE of claim 11, wherein the at least one processor is further configured to:
    perform, during the first synchronization wakeup period while the RF circuitry and the FW circuitry are in the active state and prior to the one or more measurements, one or more FW pre-processing operations, one or more software (SW) pre-processing operations, or a combination thereof.

14. The UE of claim 11, wherein the second SSBS corresponds to a next available SSBS opportunity from the wireless network component subsequent to the first SSBS.

15. The UE of claim 11, wherein one or more SSBS opportunities from the wireless network component are available between the first SSBS and the second SSBS.

16. The UE of claim 11, wherein the one or more measurements comprise one or more signal-to-noise ratio (SNR) measurements.

17. The UE of claim 11, wherein the at least one processor is further configured to:
 determine a relationship between the one or more measurements and one or more performance thresholds,
 wherein the prediction of the second SSBS is selectively performed based upon the relationship.

18. The UE of claim 17, wherein the one or more performance thresholds are based on an operational mode of the UE.

19. The UE of claim 11, wherein the prediction of the second SSBS is selectively performed based on a mobility parameter associated with the UE.

20. The UE of claim 11, wherein the at least one processor is further configured to:
 transition the RF circuitry and the FW circuitry from the active state to the sleep state during the first synchronization wakeup period.

21. A user equipment (UE), comprising:
 means for performing, during a first synchronization wakeup period while at least one processor, radio frequency (RF) circuitry and firmware (FW) circuitry are set to an active state, one or more measurements of one or more synchronization signal blocks (SSBs) of a first synchronization signal burst set (SSBS) from a wireless network component;
 means for predicting, during the first synchronization wakeup period while the at least one processor, the RF circuitry and the FW circuitry are in the active state, a second SSBS at which to wake up for a second synchronization wakeup period based on the one or more measurements;
 means for performing, during the first synchronization wakeup period while the at least one processor, the RF circuitry and the FW circuitry are in the active state, one or more FW post-processing operations based on the one or more measurements;
 means for transitioning the RF circuitry and the FW circuitry from the active state to a sleep state in response to completion of the one or more FW post-processing operations; and
 means for scheduling, during the first synchronization wakeup period while the RF circuitry and the FW circuitry are in the sleep state and the at least one processor is in the active state, a wakeup time associated with the second SSBS for the second synchronization wakeup period.

22. The UE of claim 21, further comprising:
 means for performing, during the first synchronization wakeup period while the RF circuitry and the FW circuitry are in the sleep state, one or more software (SW) post-processing operations based on the one or more measurements.

23. The UE of claim 21, wherein one or more SSBS opportunities from the base station are available between the first SSBS and the second SSBS.

24. The UE of claim 21, wherein the one or more measurements comprise one or more signal-to-noise ratio (SNR) measurements.

25. The UE of claim 21, further comprising:
 means for determining a relationship between the one or more measurements and one or more performance thresholds,
 wherein the prediction of the second SSBS is selectively performed based upon the relationship.

26. The UE of claim 25, wherein the one or more performance thresholds are based on an operational mode of the UE.

27. The UE of claim 21, wherein the prediction of the second SSBS is selectively performed based on a mobility parameter associated with the UE.

28. A non-transitory computer-readable medium storing computer-executable instructions that, when executed by a user equipment (UE), cause the UE to:
 perform, during a first synchronization wakeup period while at least one processor, radio frequency (RF) circuitry and firmware (FW) circuitry are set to an active state, one or more measurements of one or more synchronization signal blocks (SSBs) of a first synchronization signal burst set (SSBS) from a wireless network component;
 predict, during the first synchronization wakeup period while the at least one processor, the RF circuitry and the FW circuitry are in the active state, a second SSBS at which to wake up for a second synchronization wakeup period based on the one or more measurements;
 perform, during the first synchronization wakeup period while the at least one processor, the RF circuitry and the FW circuitry are in the active state, one or more FW post-processing operations based on the one or more measurements;
 transition the RF circuitry and the FW circuitry from the active state to a sleep state in response to completion of the one or more FW post-processing operations; and
 schedule, by the at least one processor during the first synchronization wakeup period while the RF circuitry and the FW circuitry are in the sleep state and the at least one processor is in the active state, a wakeup time associated with the second SSBS for the second synchronization wakeup period.

29. The non-transitory computer-readable medium of claim 28, wherein the one or more instructions further cause the UE to:
 perform, during the first synchronization wakeup period while the RF circuitry and the FW circuitry are in the sleep state, one or more software (SW) post-processing operations based on the one or more measurements.

30. The non-transitory computer-readable medium of claim 28, wherein the one or more instructions further cause the UE to:
 perform, during the first synchronization wakeup period while the RF circuitry and the FW circuitry are in the active state and prior to the one or more measurements, one or more FW pre-processing operations, one or more software (SW) pre-processing operations, or a combination thereof.

* * * * *